United States Patent [19]

Ginnow et al.

[11] 4,179,966
[45] Dec. 25, 1979

[54] SENSOR FOR DETERMINING BAND SAW DEFLECTION AND FOR GUIDING THE BAND SAW BLADE

[76] Inventors: Oscar Ginnow; Roger Ginnow, both of 68 Hopbrook Rd., Bethany, Conn. 06525

[21] Appl. No.: 873,209
[22] Filed: Jan. 30, 1978
[51] Int. Cl.² .................... B27B 13/10; B23D 55/08
[52] U.S. Cl. .................................................... 83/820
[58] Field of Search ........................................ 83/820

[56] References Cited

U.S. PATENT DOCUMENTS

| | | | |
|---|---|---|---|
| 2,914,100 | 11/1959 | Lindholm | 83/820 |
| 3,116,768 | 1/1964 | Lasar | 83/820 |
| 3,145,604 | 8/1964 | Foley | 83/820 |
| 3,220,446 | 11/1965 | Burkey | 83/820 |

Primary Examiner—Donald R. Schran
Attorney, Agent, or Firm—Prescott W. May

[57] ABSTRACT

A control system for a band saw blade. Two groups of rollers are arranged with respect to the blade so that the first is in contact with set and gullet area of the blade and the other is arranged to be adjacent to, but not in contact with the trailing edge. When the band saw blade is deflected, the first set of rollers act as a fulcrum, about which the blade pivots so as to cause the blade to return to its original path, thus permitting it to cut in a straight and smooth line. The rear rollers are correction limiting rollers, and are used to prevent over-steering of the band saw blade.

1 Claim, 9 Drawing Figures

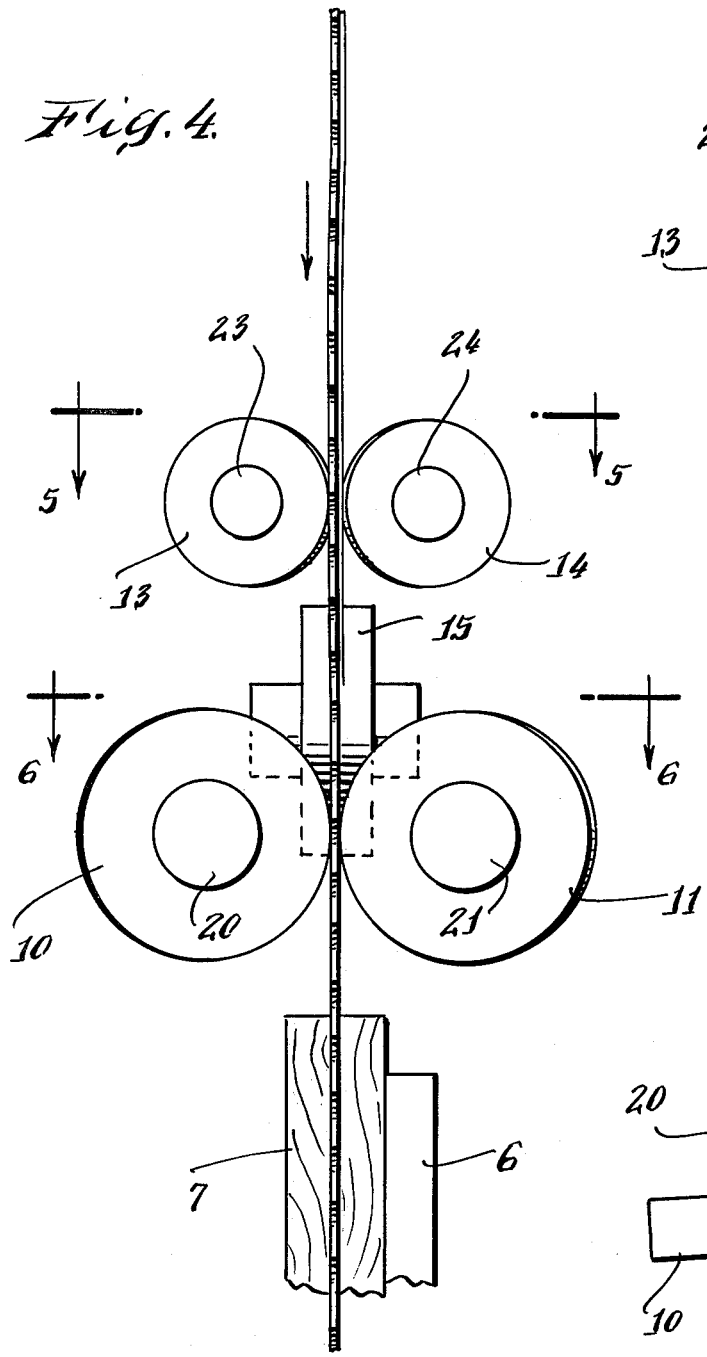
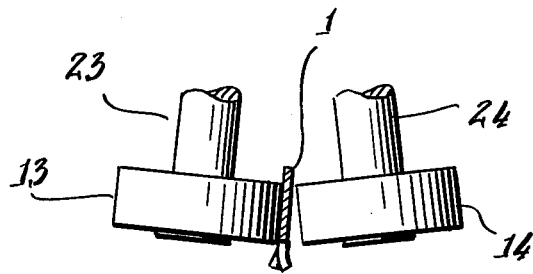
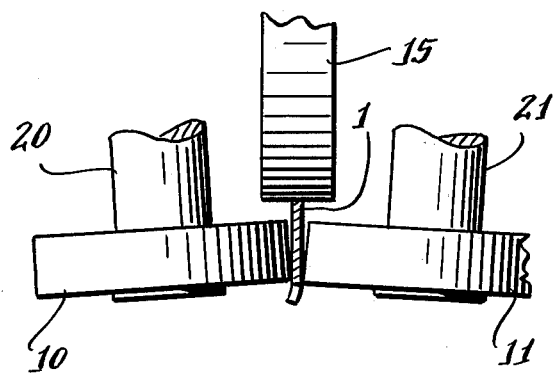

SENSOR FOR DETERMINING BAND SAW DEFLECTION AND FOR GUIDING THE BAND SAW BLADE

BACKGROUND OF THE INVENTION

In a band saw, as the saw blade advances through the workpiece, pressures which are exerted on the blade by the operator, feeding mechanism or by the material itself, such as by knots or other irregularities in the material, cause the band saw blade to bend or flex from its normal position. It is this flexing which causes the blade to be deflected from its desired path as it moves through the workpiece. The deflection of the band saw blade as it goes through the workpiece causes an uneven cutting surface which is unpleasant to the eye and which must be further mechanically planed off to present a smooth appearance. The additional step of planing is uneconomical, in the sense that it involves an additional operation, and in addition causes a further waste in the wood product.

Some of the blade deflection could be eliminated with the use of a heavier gauge blade, such as is used in a circular saw. This, however, would mean that more material would be removed from the workpiece during the cutting operation. When this operation is repeated, it would be uneconomical in the sense that there would be a great amount of wood wasted. A band saw blade is particularly economical in that it is relatively thin, and thus presents a most economical means by which to cut wood.

The prior art devices which are used in conjunction with band saws have by and large proved to be extremely complicated and either rely on electronic circuitry for sensing blade deflection and making corrections therein, such as in the Wells patent (U.S. Pat. No. 3,680,417), or rely on very complicated mechanical means for again sensing the blade deflection and making the necessary corrections thereto (Kawabata, U.S. Pat. No. 3,259,155).

The devices such as shown in the above patents have a great disadvantage in that they are unnecessarily complicated and, in most instances, do not provide a satisfactory result. Generally, the blade deflection must be quite substantial before the electrical or mechanical sensing mechanism senses the deflection and initiates a steering action to correct the deviation. The present invention senses small deviations and makes the necessary corrections. The smaller the deflections, the easier it is to make the correction, and the more pleasant the appearance of the finished product.

Thus, it is the object of the present invention to supply a simple, yet accurate means for guiding a band saw blade.

It is further object of the present invention to provide a corrective twist to a band saw blade, to provide a straight and smooth cut surface. A further object of the present invention is to provide a device that is self-compensating, without electrical, hydraulic or mechanical circuitry to guide the band saw blade. A further object is to provide a device to prevent a band saw blade from drifting from the desired cutting path. Still other objects will readily present themselves to a skilled person with reference to the specification, the drawings and the claims of this patent.

SUMMARY OF THE INVENTION

Guide rollers are set at an angle so that rollers contact the area of the saw blade behind the set and gullet of the blade. These rollers provide corrective action to the blade being deflected. A second set of rollers is located on the trailing edge, adjacent to, but not necessarily in contact with the trailing edge of the blade. These rollers are corrective limiting rollers, and are used to prevent the saw blade from being over-steered by the corrective rollers.

Thus, when the workpiece causes the blade to deflect, this deflection is partially prevented by the correction rollers. Further, those rollers act as a fulcrum to pivot the blade, so that it will be twisted or steered in the proper direction. It is the above-described twisting or steering action which returns the blade back to the side where the deflection originated, and causes the blade to travel on a straight and even course. The correction limiting rollers are used at the rear of the trailing edge of the blade to prevent an over-steering, and these also prevent the blade from running off the thrust rollers. The space between these rollers is adjustable.

When the blade is deflected sideways, the twisting or steering action is set up by the first set of corrective rollers, steering the saw blade toward the side on which the deflective pressure originated. This action causes the blade to travel back on course. With this system, deviations are detected almost immediately, and corrections are made instantaneously, so that when the machine is operating, it is almost impossible to see where they were made, or what action has taken place while the machine is in operation. An added side advantage of this arrangement is that there is a minimal buildup on the rollers, such as would be caused when the sawduct sticks to the rollers due to dampness or static electricity.

BRIEF DESCRIPTION OF THE DRAWINGS

In the drawings.

FIG. 4 is a front-elevational view of the saw mechanism of FIG. 2, without the supporting structure to show the rollers and their relationship to the saw blade.

FIG. 5 is a cross-section along the line 5—5 of FIG. 4.

FIG. 6 is a cross-section along the line 6—6 of FIG. 4.

DESCRIPTION OF THE PREFERRED EMBODIMENT

Figure 1:
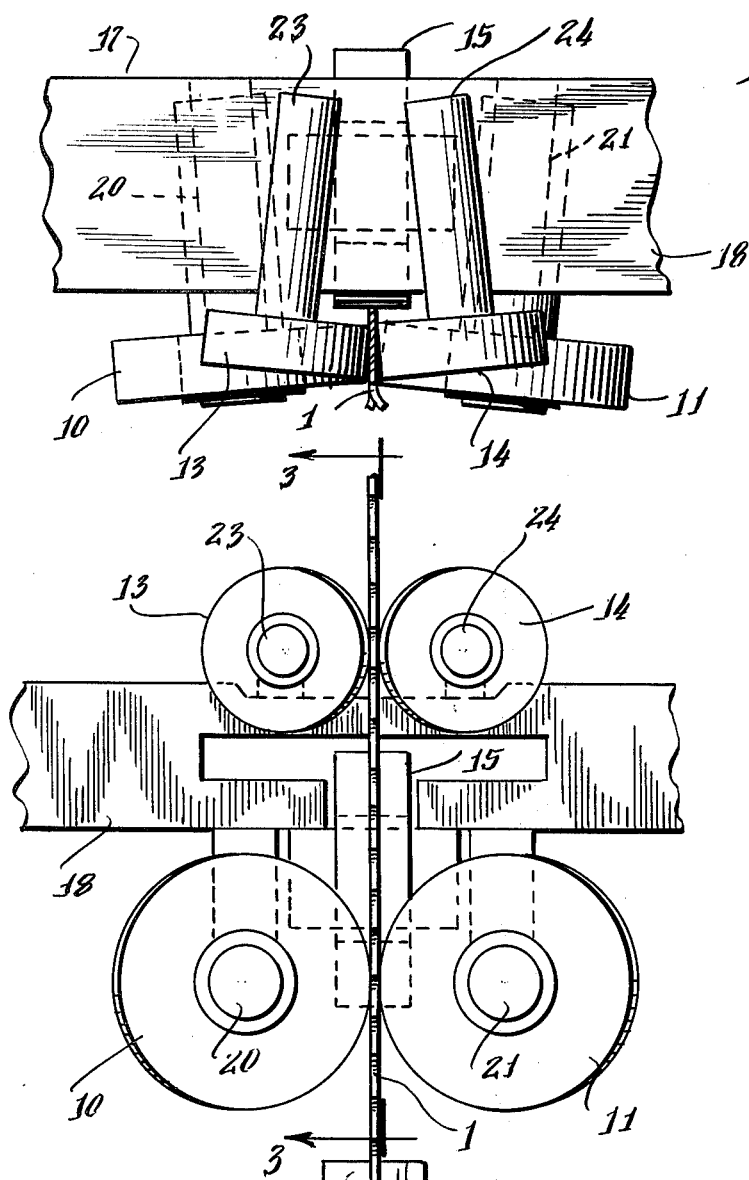
FIG. 1 is a top view partly in section, showing the arrangement of the corrective rollers, the correction limiting rollers and thrust rollers, and their relationship to the saw blade.
Figure 2:
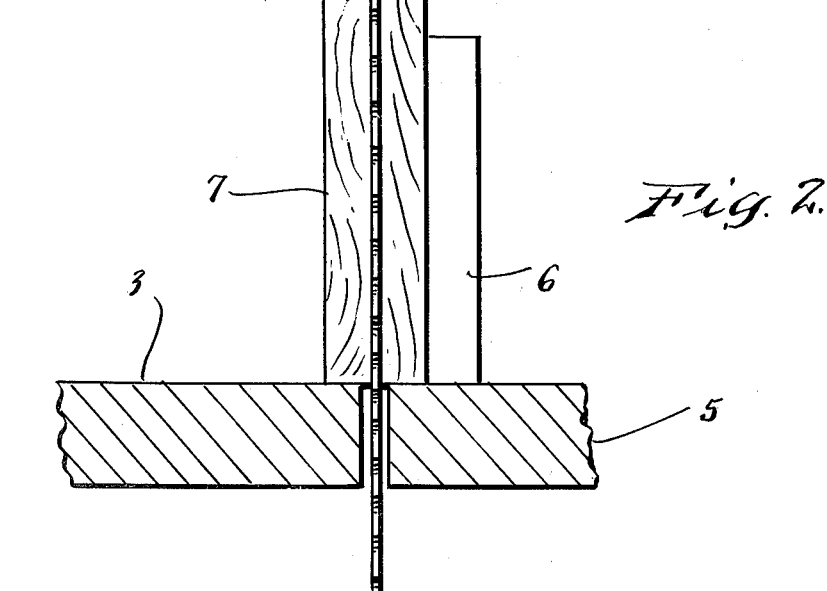
FIG. 2 is a front-elevational view of a portion of the saw mechanism which is located above the working area, and showing the rollers in position.
Figure 3:
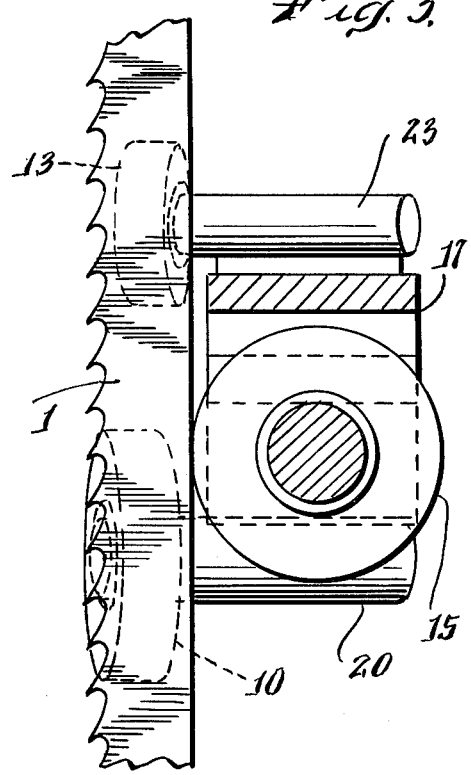
FIG. 3 is a side-elevational view of the rollers which are shown in FIG. 2.

Referring to FIGS. 1 and 2 of the drawings, saw blade 1 passes through the work area 3, which includes a table 5 and a saw guide 6. The workpiece 7 rests upon the table 5 in the work area 3, and with the use of the guide 6 is guided toward the blade 1 wherein it is cut.

The present invention utilizes a series of rollers, the first set of rollers being the correcting rollers 10 and 11. A second set of rollers 13 and 14 are located above the correcting rollers, and are correction limiting rollers. These rollers are adjacent to the trailing edge of the blade 1. A third roller, the thrust roller 15, is in contact with the trailing edge of the blade, and provides a backup for the blade so that it is not twisted or otherwise deflected by the workpiece being pushed against the working edge of the blade 1.

As can be seen from FIG. 1, the corrective rollers are located so that they are at an angle wherein the edge of the rollers contacts the front portion of the blade. The entire mechanism of correcting rollers, correction limiting rollers and thrust rollers are carried upon carriage 17. Carriage 17 is located sufficient high above the working area so as not to interfere with the wood or other workpiece which is being cut by the saw. Carriage 17 includes axles 20 and 21 upon which correcting rollers 10 and 11 are mounted. The carriage 17 also includes axles 23 and 24 upon which rollers 13 and 14 are located. It further includes axle 25 upon which thrust roller 15 is mounted.

The positioning of the rollers with respect to the workpiece and saw blade 1 can be best seen with respect to FIG. 4 wherein the carriage 17 and the cross bar 18 have been removed from the drawing. The correction rollers 10 and 11 as are shown in FIG. 6 are located on an angle to the front of the saw blade and contact the front of the saw blade just behind the set and gullet area of the blade. The correct angle has thus far been determined on an empirical basis, but from the results to date, it would appear that the angle between the saw blade and roller face is between 15° and 30° for best operation of the machine. Typically, the correction limiting rollers 13 and 14 are located upon axles 23 and 24 and are set so that they are not in contact with, but are closely adjacent to, the trailing edge of the blade 1.

Figure 7:
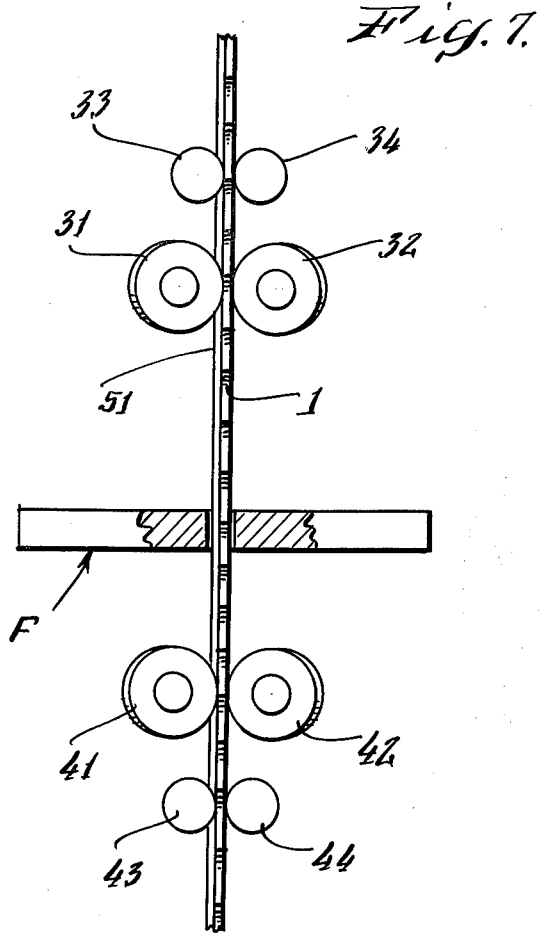
FIG. 7 is a front view with the distortion of the saw blade greatly enlarged for explanation purposes.
Figure 8:
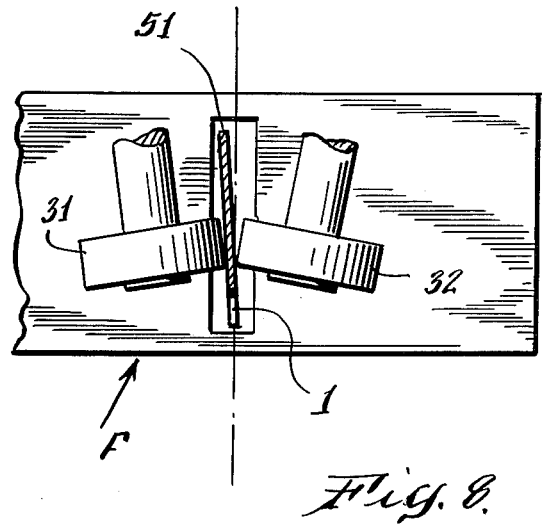
FIG. 8 is a top view of the blade and correction rollers with the distortion of the saw blade greatly enlarged for explanation purposes.
Figure 9:
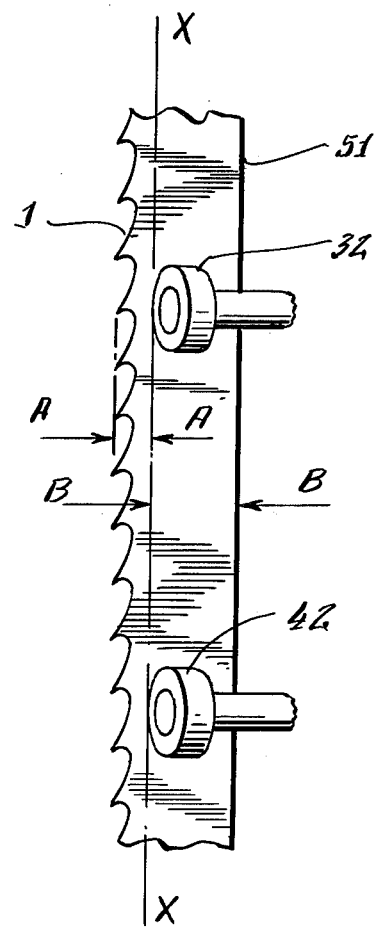
FIG. 9 is a side view of a portion of a band saw blade.

The operation of the above can best be seen with respect to FIGS. 7 through 9. As is shown in FIG. 7, there is a double set of rollers, the first set above the workpiece, such as is shown in FIGS. 1 through 6, which include correcting rollers 31 and 32, and correction limiting rollers 33 and 34. Similarly, a group of rollers is located below the workpiece and work table. These rollers, include correcting rollers 41 and 42 and also include correction limiting rollers 43 and 44.

As is shown in FIG. 7, a force F is acting on the workpiece. This force causes the workpiece to move toward the left and causes the blade to deflect in that direction.

The correction rollers are in contact with the blade 1 and provide the fulcrum about which the saw blade will pivot. The fulcrum point or contact point of the correction rollers is located behind the set and gullet area of the blade. Thus, a fairly large amount of blade area can be deflected by the side pressure of the work piece when the cut wanders from its intended straight path. The line X—X, as shown in FIG. 9, on the saw blade, is the pivot line and is not deflected because of the action of the correcting rollers 31, 32, 41 and 42 holding it rigid. Further, as shown in FIG. 9, when a side force is applied to the saw blade 1, Section B—B of the blade is deflected in the direction of the force because it has a longer lever arm than does Section A—A of the blade. As a consequence of this action, Section A—A—the saw portion—is then headed in the direction of the force and this steers the blade back on course. The correction process is limited by correction limiting rollers 33, 34, 43 and 44, which prevent the entire system from being overridden.

The deflection is shown in exaggerated form in FIGS. 7 and 8, wherein the trailing edge 51 of the blade 1 has been deflected in the direction of the force F. This in turn has caused the blade to pivot about the correction rollers and has caused the leading edge of the blade 52 to turn in the direction of the force F. Thus, the steering action is opposite but proportioned to the force.

Since the correction is accomplished imperceptably, the resultant cut produced by the mechanism is substantially smoother than is produced by other band saws. Further, because it is done by a saw blade which is substantially thinner than other blades, there is a consequent saving of wood. Thus, the present invention detects a deflection as soon as it begins, and corrections are then made.

The correcting rollers exert a counter action or counter force so as to restore the blade to its original position. The correction limiting rollers are used at the rear of the trailing edge of the blade to prevent oversteering. Over-steering would make a wavy cut, and these rollers would also prevent the blade from running off the thrust rollers which are located behind the trailing edge of the blade.

An added advantage to this arrangement is that it produces a minimal buildup on the rollers, which would be caused by sawdust sticking to the rollers due to dampness or static electricity. A buildup on the rollers is undesirable in that it causes them to run hard, heat up and eventually wear out sooner than would normally be expected in this type of operation.

The invention has been most successfully utilized with a blade of between ¾" to 1½" in width. This size is particularly advantageous in that the blade is economical to purchase and in operation removes a minimal amount of material.

The foregoing discussion and the drawings are intended as an illustrative but not limiting embodiment, so other variations and rearrangement of the parts in the spirit and scope of the present invention will readily present themselves to one skilled in the art.

We claim:

1. A band saw of the type including a band saw blade, a work table and guide wherein the improvement comprises:
    (a) a first carriage with a first and second axle in a first horizontal plane and a third and fourth axle in a second horizontal plane, said carriage located above said work table;
    (b) a first correcting roller rotatably mounted on said first axle with the said first axle and first correcting roller making an angle with the saw blade of between 15° and 30° and with the first correcting roller contacting the front portion of the saw blade behind the set and gullet areas of the blade with more than one-half of the width of the blade behind the point where the correcting rollers contact the blade;
    (c) a second correcting roller rotatably mounted on said second axle with the said second axle and said second correcting roller making an angle with the saw blade of between 15° and 30° and with the second correcting roller contacting the front portion of the saw blade behind the set and gullet areas of the blade with more than one-half of the width of the blade behind the point where the correcting rollers contact the blade;

(d) a correction limiting rollers including a third roller mounted on said third axle and a fourth roller mounted on said fourth axle, said rollers being arranged so as to be adjacent to the trailing edge of the blade;

(e) a thrust roller mounted on said first carriage and arranged so as to be in contact with the trailing edge of the band saw blade;

(f) a second carriage with a first and second axle and a first horizontal plane and a third and fourth axle in a second horizontal plane, said carriage located below the work table;

(g) a first correcting roller rotatably mounted on the first axle of said second carriage with the said first axle and first correcting roller making an angle with the saw blade of between 15° and 30° and with the first correcting rollers contacting the front portion of the saw blade behind the set and gullet area of the blade with more than one-half of the width of the blade behind the point where the correcting rollers contact the blade;

(h) a second correcting roller rotatably mounted on the second axle of the second carriage with the said second axle and second correcting roller making an angle with the saw blade of between 15° and 30° and with the second correcting roller contacting the front portion of the saw blade behind the set and gullet areas of the blade with more than one-half of the width of the blade behind the point where the correcting roller contacts the blade;

(i) correction limiting rollers located on said second carriage including a third roller mounted on said third axle and a fourth roller mounted on said fourth axle with said rollers arranged so as to be adjacent to the trailing edge of the blade;

(j) a thrust roller mounted on said second carriage and arranged so as to be in contact with the trailing edge of the band saw blade whereby the edge of the correcting roller acts as a pivot for the blade so that the blade is steered in the direction from which the force comes so as to provide a smooth, clean cut.

* * * * *